(12) United States Patent
Kim (10) Patent No.: US 7,751,936 B2
(45) Date of Patent: Jul. 6, 2010

(54) PROCESSING METHOD FOR PLAYING MULTIMEDIA CONTENT INCLUDING MOTION CONTROL INFORMATION IN NETWORK-BASED ROBOT SYSTEM

(75) Inventor: Kyoung Jin Kim, Seoul (KR)

(73) Assignee: Robomation Co., Ltd., Seoul (KR)

( * ) Notice: Subject to any disclaimer, the term of this patent is extended or adjusted under 35 U.S.C. 154(b) by 1185 days.

(21) Appl. No.: 11/327,403

(22) Filed: Jan. 9, 2006

(65) Prior Publication Data

US 2006/0161301 A1   Jul. 20, 2006

(30) Foreign Application Priority Data

Jan. 10, 2005  (KR) .............................. 10-2005-2268

(51) Int. Cl.
*G06F 19/00* (2006.01)
(52) U.S. Cl. .................... 700/245; 446/268; 709/203
(58) Field of Classification Search ................. 700/245, 700/257, 258; 446/265, 268, 297, 298, 397, 446/484; 709/201, 202, 203, 217, 218, 219, 709/230, 231, 232
See application file for complete search history.

(56) References Cited

U.S. PATENT DOCUMENTS

| | | | |
|---|---|---|---|
| 6,292,714 B1 * | 9/2001 | Okabayashi | 700/245 |
| 6,542,925 B2 * | 4/2003 | Brown et al. | 709/208 |
| 6,629,133 B1 * | 9/2003 | Philyaw et al. | 709/217 |
| 6,800,013 B2 * | 10/2004 | Liu | 446/297 |
| 7,139,843 B1 * | 11/2006 | Brown et al. | 709/246 |
| 2002/0077021 A1 * | 6/2002 | Cho et al. | 446/265 |
| 2005/0226192 A1 * | 10/2005 | Red et al. | 370/338 |
| 2005/0234592 A1 * | 10/2005 | McGee et al. | 700/245 |
| 2006/0195598 A1 * | 8/2006 | Fujita et al. | 709/230 |

* cited by examiner

*Primary Examiner*—Thomas G Black
*Assistant Examiner*—Ce Li
(74) *Attorney, Agent, or Firm*—Birch, Stewart, Kolasch & Birch, LLP

(57) ABSTRACT

Disclosed herein is a processing method for playing motion-including multimedia content using a network-based robot system. The method including the step at which the service server forms and stores motion-including multimedia content data packets by inserting synchronized robot terminal motion control data into a multimedia content file divided at packet playing time intervals; the step at which, when a user issues a command to play specific motion-including multimedia content in a specific robot terminal, the command is transmitted to a service server; the step at which, in response to the transmitted command, the service server reads motion-including multimedia content data packets corresponding to the specific motion-including multimedia content and sequentially transmits the read motion-including multimedia content data packets to the buffer of the specific robot terminal; and the step at which the specific robot terminal sequentially stores the motion-including multimedia content data packets in the buffer, and sequentially reads and plays the motion-including multimedia content data packets at the packet playing time intervals.

10 Claims, 8 Drawing Sheets

| V | DT | SEQ | TS | SID | ML/SL | AL | VL | XL | MD/SD | AD | VD | XD | CS |

[Fig 5]

| ST | ID(1) | CD(1) | ST | ID(2) | CD(2) | . . . | ST | ID(n) | CD(n) |

[Fig 6]

| V1 | DT1 | SEQ1 | TS1 | SID1 | ML1/SL1 | AL1 | VL1 | XL1 | MD1/SD1 | AD1 | VD1 | XD1 | CS1 |
|---|---|---|---|---|---|---|---|---|---|---|---|---|---|

| V2 | DT2 | SEQ2 | TS2 | SID2 | ML2/SL2 | AL2 | VL2 | XL2 | MD2/SD2 | AD2 | VD2 | XD2 | CS2 |
|---|---|---|---|---|---|---|---|---|---|---|---|---|---|

. .
. .
. .

| V50 | DT50 | SEQ50 | TS50 | SID50 | ML50/SL50 | AL50 | VL50 | XL50 | MD50/SD50 | AD50 | VD50 | XD50 | CS50 |
|---|---|---|---|---|---|---|---|---|---|---|---|---|---|

| ID | Password | ID Info 1 | ID name 1 | Prod Codes | ID Info 2 | ID name2 | . . . |

PROCESSING METHOD FOR PLAYING MULTIMEDIA CONTENT INCLUDING MOTION CONTROL INFORMATION IN NETWORK-BASED ROBOT SYSTEM

BACKGROUND OF THE INVENTION

1. Field of the Invention

The present invention relates to a processing method for playing multimedia content including motion control information in a network-based robot system.

2. Description of the Related Art

In the future, various home robots will spread to almost every home and various functions will be performed using such home robots. One of the representative fields of use of home robots is the field of education using the playing of voice and image content (hereinafter "multimedia content"), such as fairy tale narration and English education.

Meanwhile, in a conventional home robot system, when a user accesses a service sever via a home robot or Personal Computer (PC) and purchases a specific narrated fairy tale or English learning content with or without charge from a website, all of the sentence/voice and image files for the content, which are stored in the service server, are downloaded and stored in the home robot. Thereafter, at the time desired by a user, in the home robot, the narrated fairy tale or English learning content is played in such a way as to play the image file while generating utterances through conversion into a voice file using a Text-To-Speech (TTS) engine or through the transmitted voice file. As a result, in order to play such a large amount of downloaded voice and image data, the home robot requires a PC-class high-capacity processing unit and storage device (memory and hard disk drive), therefore the price of the home robot inevitably increases.

Furthermore, at the time of playing voice and images for such a narrated fairy tale and such English learning, the home robot only plays voice and images, but does not make motions related to the voice and the images (for example, the bow of the home robot when the sentence "How are you?" or "Hello" is sounded, a gesture of the bow, a motion of opening and closing the mouth, or the like), so that the conventional home robot system cannot attract the interest of infants or children that use narrated fairy tales or English learning content.

As a result, in order to use voice and image content in the current home robot system, the home robot requires a high-capacity Central Processing Unit (CPU) and a storage device, and motions corresponding to voice and images are not provided, so that the system cannot attract interest.

SUMMARY OF THE INVENTION

Accordingly, the present invention has been made keeping in mind the above problems occurring in the prior art, and an object of the present invention is to provide a processing method for playing multimedia content including motion control information in a network-based robot system, through which a low price home robot can be provided and the home robot can make motions synchronized with the playing of voice and images.

In order to accomplish the above object, the present invention provides a processing method for playing motion-including multimedia content using a network-based robot system, the network-based robot system including robot terminals connected to a network and a service server configured to control the robot terminals, the method including the step at which the service server forms and stores motion-including multimedia content data packets by inserting synchronized robot terminal motion control data into a multimedia content file divided at packet playing time intervals; the step at which, when a user issues a command to play specific motion-including multimedia content in a specific robot terminal, the command is transmitted to the service server; the step at which, in response to the transmitted command, the service server reads motion-including multimedia content data packets corresponding to the specific motion-including multimedia content and sequentially transmits the read motion-including multimedia content data packets to the buffer of the specific robot terminal in packet form; and the step at which the specific robot terminal sequentially stores the motion-including multimedia content data packets in the buffer, and sequentially reads and plays the motion-including multimedia content data packets at the packet playing time intervals.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

First, the entire construction and operation of a robot system of the present invention for achieving a low-cost home robot are described with reference to FIG. 1. Furthermore, since the home robot according to the present invention has only a basic construction for playing and operation, it acts like a terminal of a computer system, so that it is hereafter referred to as a "robot terminal".

Each robot terminal 1-1, 1-2, . . . , or 1-N of a home includes a motor/relay 2-1, 2-2, . . . , or 2-N for actuating lips, joints and wheels, a drive circuit 3-1, 3-2, . . . , or 3-N for driving the motor/relay 2-1, 2-2, . . . , or 2-N, sensors 4-1, 4-2, . . . , or 4-N such as a microphone, a transceiver device 5-1, 5-2, . . . , or 5-N for transmitting sensing signals, which are transmitted from the sensors 4-1, 4-2, . . . , or 4-N, to a server 7 and receiving data, which is transmitted from the server 7, at the robot terminal 1-1, 1-2, . . . , or 1-N, a Digital/Analog (D/A) converter 6-1, 6-2, . . . , or 6-N and a speaker 10-1, 10-2, . . . , or 10-N for generating utterances for a voice file, which is transferred from the server 7, if necessary, and an image display control device (not shown) for displaying a transferred image file on a monitor when the robot terminal 1-1, 1-2, . . . , or 1-N has the monitor for playing images.

The transceiver device 5-1, 5-2, . . . , or 5-N of each robot terminal 1-1, 1-2, . . . , or 1-N is wirelessly connected to each home gateway 8-1, 8-2, . . . , or 8-N that is assigned a unique Internet Protocol (IP) address, and each home gateway 8-1, 8-2, . . . , or 8-N is connected to the server 7.

The server 7 receives sensing signals from the various sensors 4-1, 4-2, . . . , or 4-N of each robot terminal 1-1, 1-2, . . . , or 1-N through each home gateway 8-1, 8-2, . . . , or 8-N, performs necessary processing and analysis, transmits a voice file and an image file to the robot terminal 1-1, 1-2, . . . , or 1-N, and transmits a motion control data (drive control data for the motor or relay that control the movement of lips and joints for respective packet playing time intervals that will be described later) synchronized with the voice and image files.

The robot terminal 1-1, 1-2, . . . , or 1-N, having received the motion control data through the transceiver device 5-1, 5-2, . . . , or 5-N, transmits the motion control data to the motor/relay drive circuit 3-1, 3-2, . . . , or 3-N for lips, joints and wheels, so that the drive circuit 3-1, 3-2, . . . , or 3-N drives the motor/relay 2-1, 2-2, . . . , or 2-N. As a result, the robot terminal 1-1, 1-2, . . . , or 1-N performs an appropriate motion.

Furthermore, when the server 7 generates a voice file by converting text into the voice file using its TTS engine 9 or performing recording, and transmits the generated voice file to the robot terminal 1-1, 1-2, . . . , or 1-N, the robot terminal 1-1, 1-2, . . . , or 1-N, having received the voice file, converts the voice file into analog voice signals using the D/A converter 6-1, 6-2, . . . , or 6-N and generates utterances through the speaker 10-1, 10-2, . . . , or 10-N.

Furthermore, if there are images related to the motion or utterances, a received image file is transmitted to the image display control device, so that the related images are displayed on the monitor of the robot terminal 1-1, 1-2, . . . , or 1-N.

As described above, when the robot terminal 1-1, 1-2, . . . , or 1-N is provided only with the transceiver device 5-1, 5-2, . . . , or 5-N for the transmission and reception of data to and from the server 7, the sensors 4-1, 4-2, . . . , or 4-N such as a microphone, the motor/relay 2-1, 2-2, . . . , or 2-N, the motor/relay drive circuit 3-1, 3-2, . . . , or 3-N and, the D/A converter 6-1, 6-2, . . . , or 6-N and the speaker 10-1, 10-2, . . . , or 10-N, and/or the image display control device and monitor, and high-capacity data processing, such as the generation of motion control data for the robot terminal 1-1, 1-2, . . . , or 1-N and the generation of voice files and/or image files, is allowed to be performed in the service server 7, the robot terminal 1-1, 1-2, . . . , or 1-N does not require a high-capacity CPU and high-capacity memory, so that it is possible to provide-inexpensive home robots at a low price.

Now, the home gateway 8 used for the present invention is described in more detail below.

The home gateway 8 is connected using various methods. For example, wired methods, such as an Ethernet LAN method, a Power Line Communication (PLC) method and a home Phoneline Networking Alliance (PNA) method, may be used.

Figure 1:
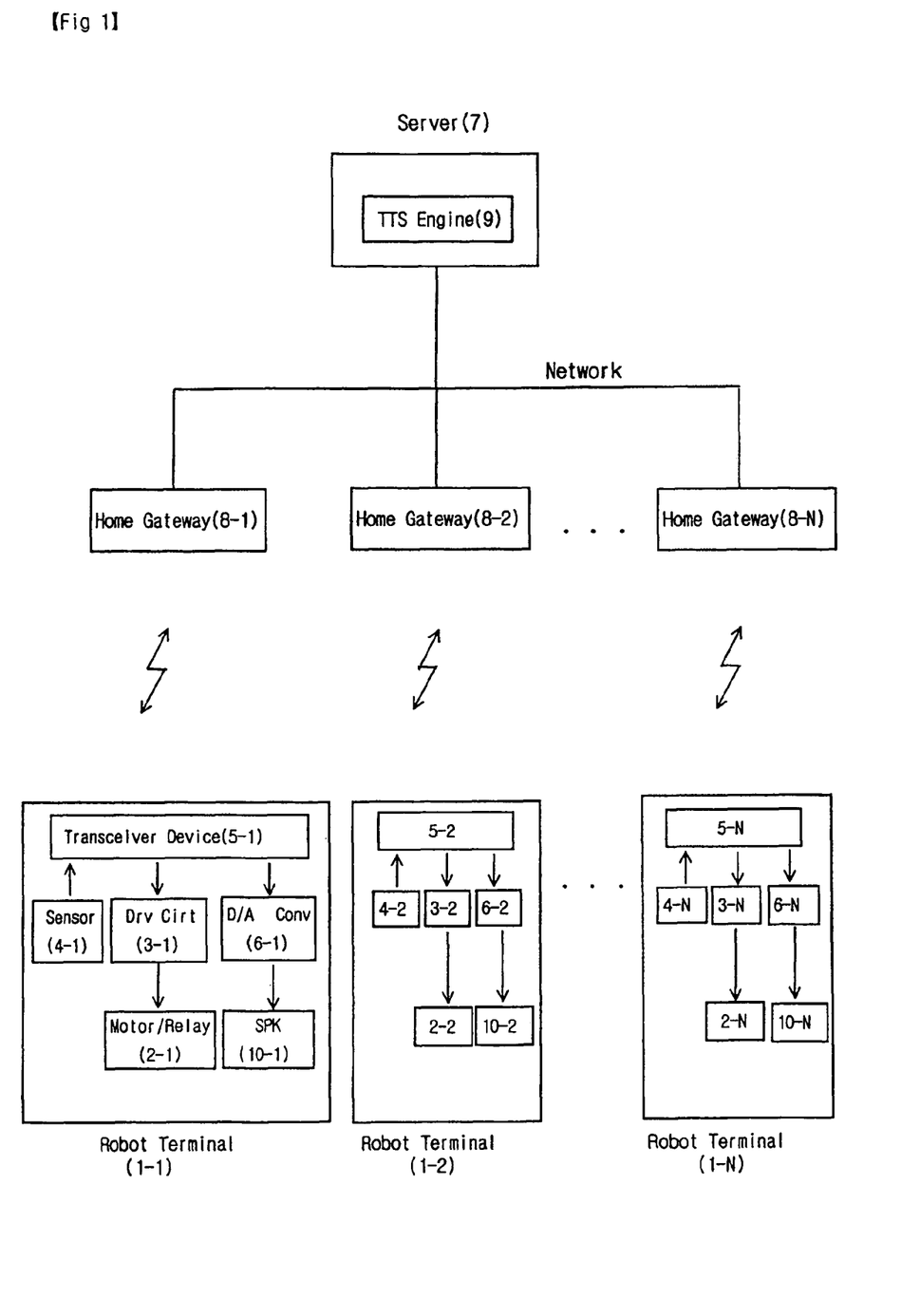
FIG. 1 is a diagram illustrating the entire construction of the present invention.

The robot terminal 1 of the present invention can basically communicate with the home gateway 8, as illustrated in FIG. 1. In a home having no home gateway 8 because a home network is not installed, wireless communication with the robot terminal 1 is performed using an Access Point (AP) connected to a high-speed Internet line and a wireless LAN (not shown), instead of the home gateway 8. In this case, the robot terminal 1 must includes an Internet protocol directly connectable to the service server 7 and wireless LAN (IEEE 802.11x). In addition to wireless LAN (IEEE 802.11x), wireless communication technology developed for home networking includes HomeRF, Bluetooth, Ultra Wide Bandwidth (UWB), wireless 1394, ZigBee, Wireless USB, etc.

Now, a method in which the robot terminal 1 of the present invention connects to the service server 7 is described below.

Since the functions of the robot terminal 1 itself according to the present invention are very limited, the assistance of the service server 7 is absolutely necessary. Accordingly, when power is applied to the robot terminal 1, the robot terminal 1 must connect to the network and communicate with the service server 7.

Figure 2:
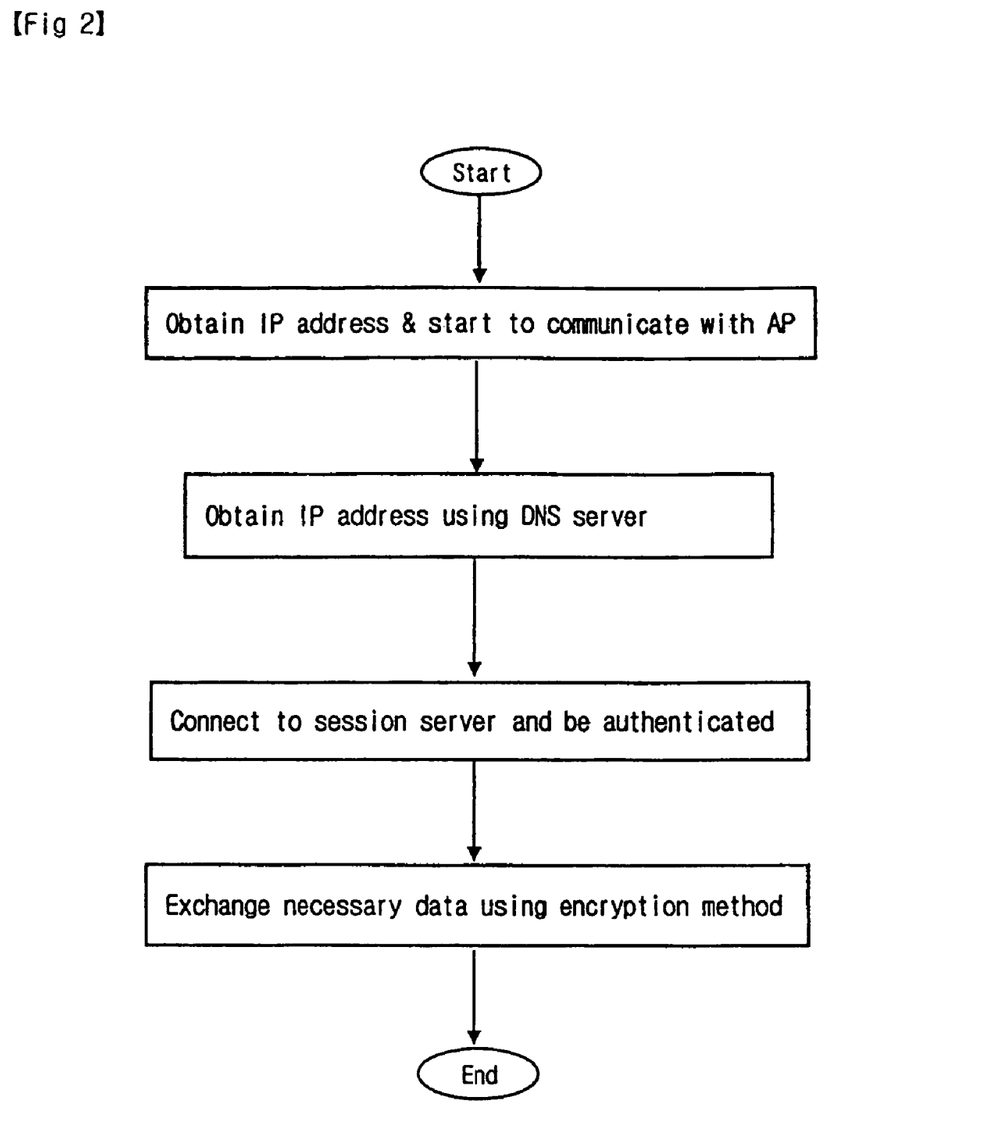
FIG. 2 is a flowchart illustrating a process of accessing a service server at the time of applying power to a robot terminal in the present invention.

A process in which the robot terminal 1 connects to the service server 7 when power is applied to the robot terminal is described with reference to FIG. 2. The case where the robot terminal 1 connects to the service server 7 through a home AP and the Internet is described.

1. The robot terminal 1 obtains a local IP address using Dynamic Host Configuration Protocol (DHCP), and starts to communicate with the AP.

2. The robot terminal 1 finds the IP address of the domain of the service server 7 using Domain Name Service (DNS).

3. The robot terminal 1 connects to a session server and is authenticated.

4. The robot terminal 1 transmits and receives necessary data using an encryption method.

Next, a method of transmitting and receiving data between the service server 7 and the robot terminal 1 in the present invention so as to make motions synchronized with voice and/or images is described below.

Unlike a typical robot, for the service server 7 to remotely control the robot terminal 1 connected to the network, the following two aspects must be taken into account.

First, the lack of uniformity of time delay and arrival time that occur at the time of transmitting data via a network must be taken into account. Second, a process of reacting and causing a necessary motion in real time to be performed when the robot terminal 1 moves or interacts with a human must be taken into account.

For example, if voice information, which is converted into a voice file by the TTS engine 9 of the service server 7, and motion information, which is a motion control data file (for example, motion control data for the movement of lips), are separately transmitted so as to cause the robot terminal 1 to perform a corresponding operation while generating utterances, the arrival time of the voice information and the arrival time of the motion information do not coincide with each other, so that it is impossible for the robot terminal 1 to perform the corresponding motion while generating utterances.

In order to prevent the above problem, a method of installing a large amount of buffer memory in the robot terminal 1, receiving and storing voice information and motion information, and performing a corresponding motion while generating utterances may be considered. However, this method employs a technique of playing voice information and motion information after receiving overall voice information and motion information, so that it is defective in that it does not react in real time.

Figure 3:
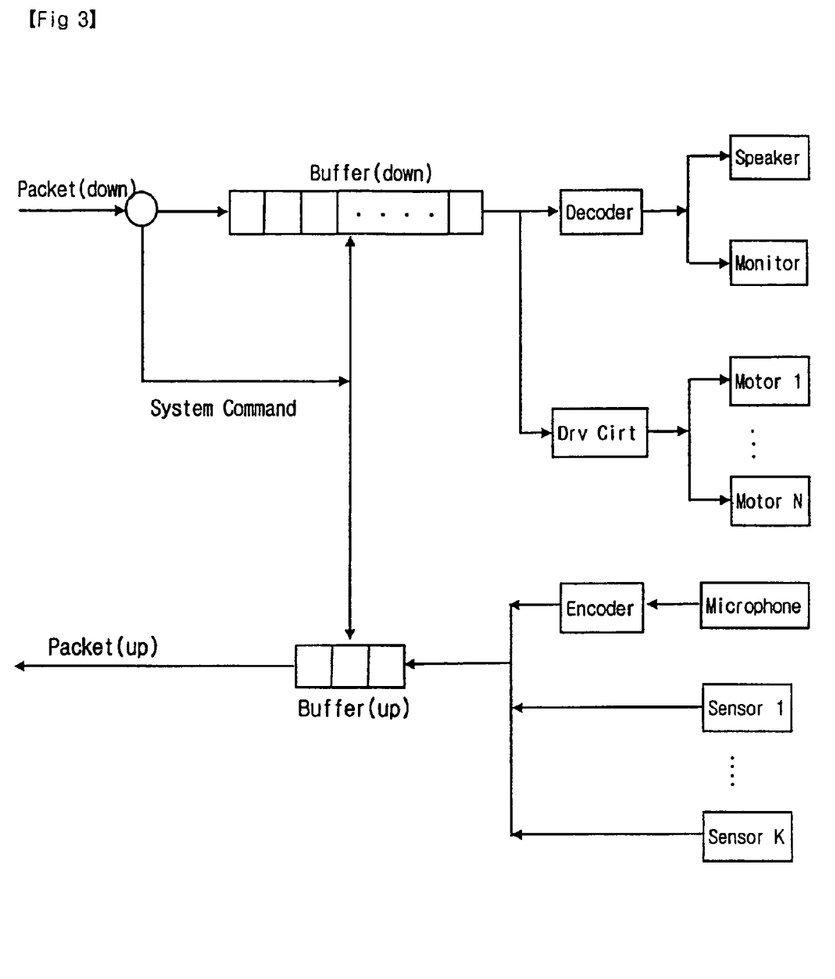
FIG. 3 is a diagram illustrating a combined communication method for the present invention.

Accordingly, in the present invention, data between the robot terminal 1 and the service server 7 is classified into synchronous data and asynchronous data. A combined transmission method is employed to correspond to the characteristics of respective types of data, as illustrated in FIG. 3.

In that case, synchronous data is data that is used to cause the robot terminal 1 to continuously perform motions, generate utterances and perform an image display, and refers to motion data (for example, data related to the movement of the lips, the expression of the face and the action of the body), and voice and/or image data corresponding to the motion data. These voice and image data are collectively referred to as multimedia data. Furthermore, synchronous data refers to data that is not generated by interaction with surroundings or a human but is previously prepared and stored in the service server 7. Asynchronous data refers to the outputs of the sensors 4, which are transmitted in real time, and system commands, which are real-time control data urgently transmitted from the service server 7, other than previously stored multimedia data.

System commands must be executed as soon as they are received. System commands may be classified as follows:

1. Commands related to a network: data related to a MAC address, a wireless operation mode and an AP 2. Data related to authentication and security 3. Commands related to the playing of multimedia: data related to a playing rate, a screen size, Mono/Stereo switching, etc.

4. Buffer control commands: data related to the clearing of a buffer, the filling of a buffer, the currently remaining size of a buffer, the adjustment of the size of a buffer, etc.

Figure 4:
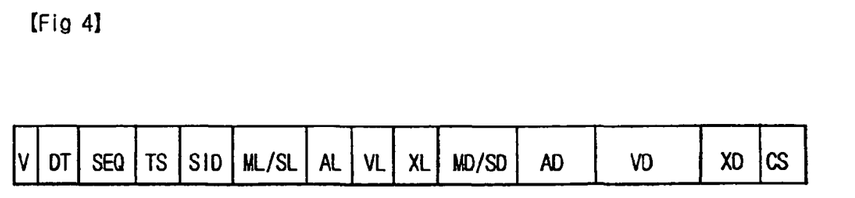
FIG. 4 is a diagram illustrating the format of packet data used in the present invention of FIG. 3.

5. Data related to the setting of a sensor table: data related to the setting of the types of sensors and the intervals of transmission FIG. 4 illustrates the format of a data packet that is used for the communication method of FIG. 3. A header field (fields V to XL) includes a version number field V indicating the protocol version number of the motion-including multimedia data packet, a data type field DT indicating the types of data (audio data, video data, motion data, system command, ACK, and the like) included in the packet, a sequence field SEQ indicating the position of the packet in the sequence of transmission, a time stamp field TS indicating the time when the packet is transmitted, a session ID field SID identifying a current session and supporting security, a length field ML for motion control data at the time of downstream packet transmission (will be described later) or a length field SL for the values of various sensors, such as a distance sensor, installed in the robot terminal 1, a voice data length field AL, a video data length field VL, and an auxiliary data length field XL indicating the length of other data, such as a system command.

A motion data field MD or a sensor data field SD includes motor/relay motion control data that is used to produce the desired motion of the robot terminal 1, and sensor values that is detected by the sensor of the robot terminal 1. A voice data field AD includes voice data that is used to generate utterances in the case of generating utterances while performing a motion or without performing a motion, or voice data that is obtained by voice input through the microphone of the robot terminal 1. An image data field VD includes image data that must be displayed on a monitor in conjunction with motions and/or utterances, or image data that is detected by the camera of the robot terminal 1. An auxiliary data field XD includes other data, such as a system command. Finally, a Check-Sum (CS) that indicates the validity of the motion data MD, the sensor data SD, the voice data AD, the image data VD and the auxiliary data XD is included.

Figure 5:
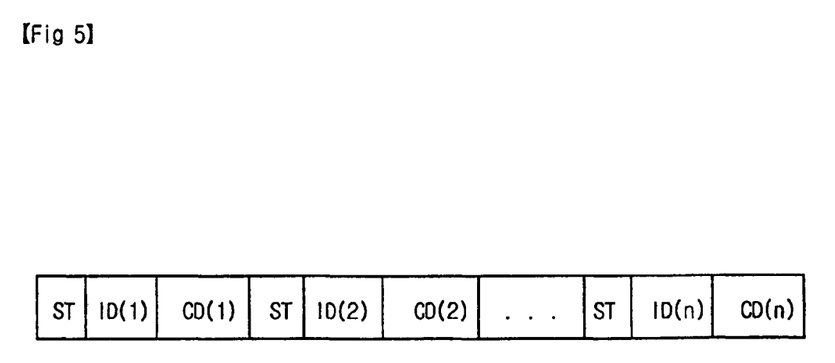
FIG. 5 is a diagram illustrating the format of motion control data.

Meanwhile, as shown in FIG. 5, the motion data field MD is composed of repetitions of an ID indicating each actuation device (motor/relay or the like), Control Data (CD) controlling the actuation device, and an identifier ST identifying each actuation device.

Referring to FIG. 3 again, data transmitted from the service server 7 is transferred to the robot terminal 1 in the form of downstream packets using TCP/IP or UDP/IP protocol. The processing device (not shown) of the robot terminal 1 reads the data type DT from the header field of each packet whenever the packet is transferred to the robot terminal 1. If the packet includes synchronous data (audio/video/motion data), the synchronous data is sequentially stored in the downstream buffer (one buffer zone has a size that is determined such that playing can be completed within a given packet playing time Ts). If the packet includes asynchronous data (system command), the system command, that is, the asynchronous data, is directly transferred without being stored in the buffer, so that the robot terminal 1 immediately performs an operation corresponding to the system command.

The synchronous data stored in the downstream buffer on a packet basis is read from the downstream buffer by the processing device of the robot terminal 1 at packet playing time intervals Ts one by one, and the data size fields ML, AL and VL included in the header are examined. If all of motion, voice and image data is included in the synchronous data, data corresponding to the motion data field MD, the voice data field AD and the image data field VD is read, the motion data MD is transferred to the motor/relay drive circuit 3, thereby operating the motor/relay 2 and making a motion, the voice data AD is converted into an analog voice signal through a decoder and the D/A converter 6, thereby generating utterances through the speaker 10, and the image data VD is displayed on the monitor through the decoder and the image display control device. As a result, since utterance/image display/motion control data required to be played is read from the downstream buffer at packet playing time intervals Ts one by one and then played, it is possible to play motion-including multimedia in which voice, images and motions are synchronized with each other.

Now, a detailed description is given, with the case where the robot terminal 1 is operated at an interval of Ts=40 ms (25 per second), the voice data AD is 16 bit and 16,000 Hz (32,000 bytes per second) Adaptive Differential Pulse Coded Modulation (ADPCM) data, the image data VD does not exist, and 50 buffers are used, being taken as an example.

The downstream buffer of the robot terminal 1 can store 40 ms×50=2.0 seconds of synchronous data, so that an unexpected communication failure for up to two seconds can be overcome and a motion and an utterance without disconnection is guaranteed. In this case, when an ADPCM algorithm having a compression rate of ¼ is employed, the size of necessary memory for voice data is 320 bytes×50=16 Kbytes because voice data of 32,000 bytes/4/25=8,000/25=320 bytes is stored in a single buffer. The size of voice data AD will increase or decrease depending on the status of communication, the quality of voice data or the like.

Next, an operation based on the system command SC is described using an example.

When the robot terminal 1 plays a stereo narrated fairy tale while playing a mono narrated fairy tale, the following two methods may be used.

1. The service server 7 transmits a system command SC directing the transmission of the remaining size of a buffer to the robot terminal 1 and receives the remaining size of the buffer. When the received value is 0, the service server 7 transmits a system command SC directing the change of the playing function to a stereo mode to the robot terminal 1 and starts to transmit synchronous data, including new stereo audio data, after the robot terminal 1 has changed the audio play mode to the stereo mode.

2. When the service server 7 transmits a system command SC directing the clearing of the content of the buffer to the robot terminal 1 and the robot terminal 1 clears the content of the buffer, the service server 7 transmits a system command SC directing the change of an audio play mode to a stereo play mode to the robot terminal 1 and the robot terminal 1 changes the audio play mode to the stereo play mode, the service server 7 starts to transmit synchronous data including new stereo audio data.

Next, an upstream packet transmitted from the robot terminal 1-1, 1-2, . . . , or 1-N to the service server 7 is described. Analog voice data (voice command data or the like) input from a microphone is converted into digital data by an A/D converter (not shown), is compressed by an encoder, is stored in an upstream buffer (which has a considerably small size, compared to the downstream buffer), along with the outputs of various sensor S1, . . . , and Sk (obstacle detection sensor or the like), and is transmitted to the service server 7 in the format shown in FIG. 4 and in packet stream form.

Now, the sensor value of an upstream packet transmitted from the robot terminal 1 to the service server 7 is described in detail.

In a general robot remote control system controlled by a network, a command is transmitted downward, and then the value of a sensor reacting to the command is detected. However, in the method, the received value of the sensor is different from the current value of the sensor due to network time delay. For example, when a robot encounters an unexpected obstacle while moving, an urgent measure may be realized only after collision with the obstacle, even though the robot takes the urgent measure (for example, a service server issues a command that the robot urgently stops). In the case where a robot moves along a circle, the arrival time of a sensor value is not constant, so that accurate track following is not achieved.

In the present invention, a specific sensor value is periodically transmitted regardless of the request of the service server 7 so as to overcome the problem of the prior art. In other words, specific sensor values determined to be necessary, for example, distance/ultrasonic/body detection sensor values during movement, are transmitted at preset intervals without any direction of the service server 7. The method has the disadvantage of continuously occupying the communication bandwidth, but can deal rapidly with unexpected hindrances. Meanwhile, using a UDP communication method instead of a TCP communication method, transmission is performed regardless of where reception is performed, so that there is a possibility that some packets may be lost. However, the method has a short transmission interval, so that great problems rarely occur even if there is such a slight loss. As a result, since sensor values are transmitted at considerably short and preset intervals, it is very easy to predict sensor values at the next interval and extrapolate lost values. In practice, the transmission interval of the sensor preferably falls within a range from 20 ms to 100 ms, and this transmission interval will vary depending on the status of communication and the operating rate and accuracy of the robot terminal 1.

As a result, since it is very ineffective to transmit the values of variation from all of the various sensors installed in the robot terminal 1 at such short intervals, the values of environmental sensors, such as temperature and humidity sensors, are transmitted at long intervals because variation in the values of them is low. In contrast, the values of a distance sensor and a sound-related sensor are transmitted at considerably short intervals in consideration of the characteristics thereof.

In the present invention, the service server 7 sets the kinds of necessary sensor values and the intervals at which sensor values are transmitted in the robot terminal 1 using a system command SC, and information about the kinds of sensor values and the intervals of transmission of the sensor values, which are required by the service server 7, is stored in the robot terminal 1 in the form of a sensor table. Through the sensor table, the robot terminal 1 becomes aware of the kinds of sensors, which must transmit sensor values to the service server 7, and the corresponding intervals of transmission, reads sensor values from corresponding sensors at corresponding intervals, and transmits the sensor values to the service server 7. The set sensor table is continuously effective until the next setting is performed.

Next, a process of forming motion-including multimedia file packets in the server 7 and transmitting a motion-including multimedia file from the server 7 to the robot terminal 1 on a packet basis as described above is described below with reference to FIGS. 6 and 7, which illustrate an embodiment in which related motions, along with utterance/images regarding "How are you?", are performed.

Figure 6:
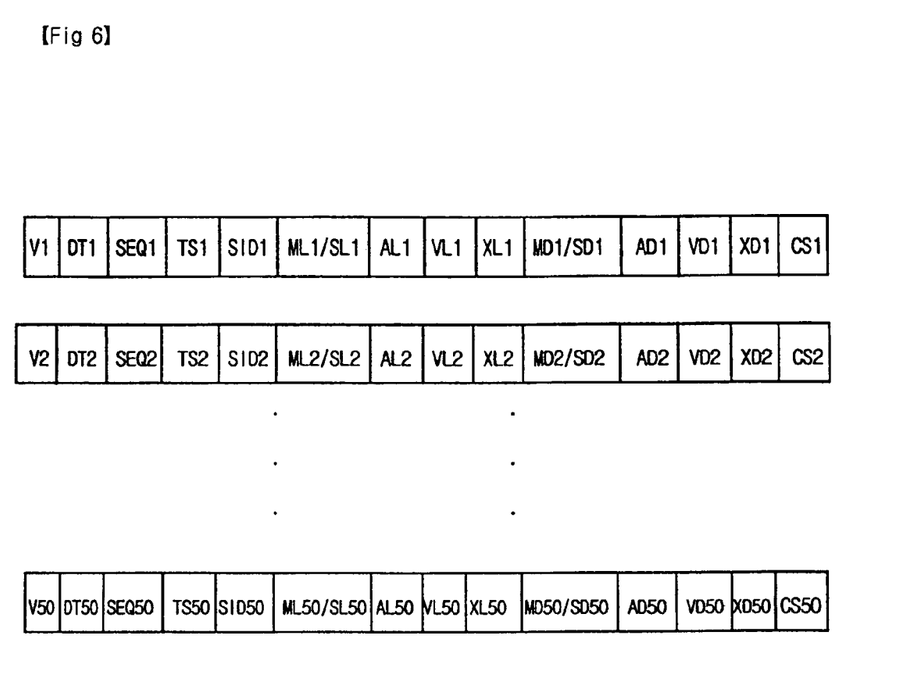
FIG. 6 is a diagram illustrating motion-including multimedia content data packets according to the present invention.
Figure 7:
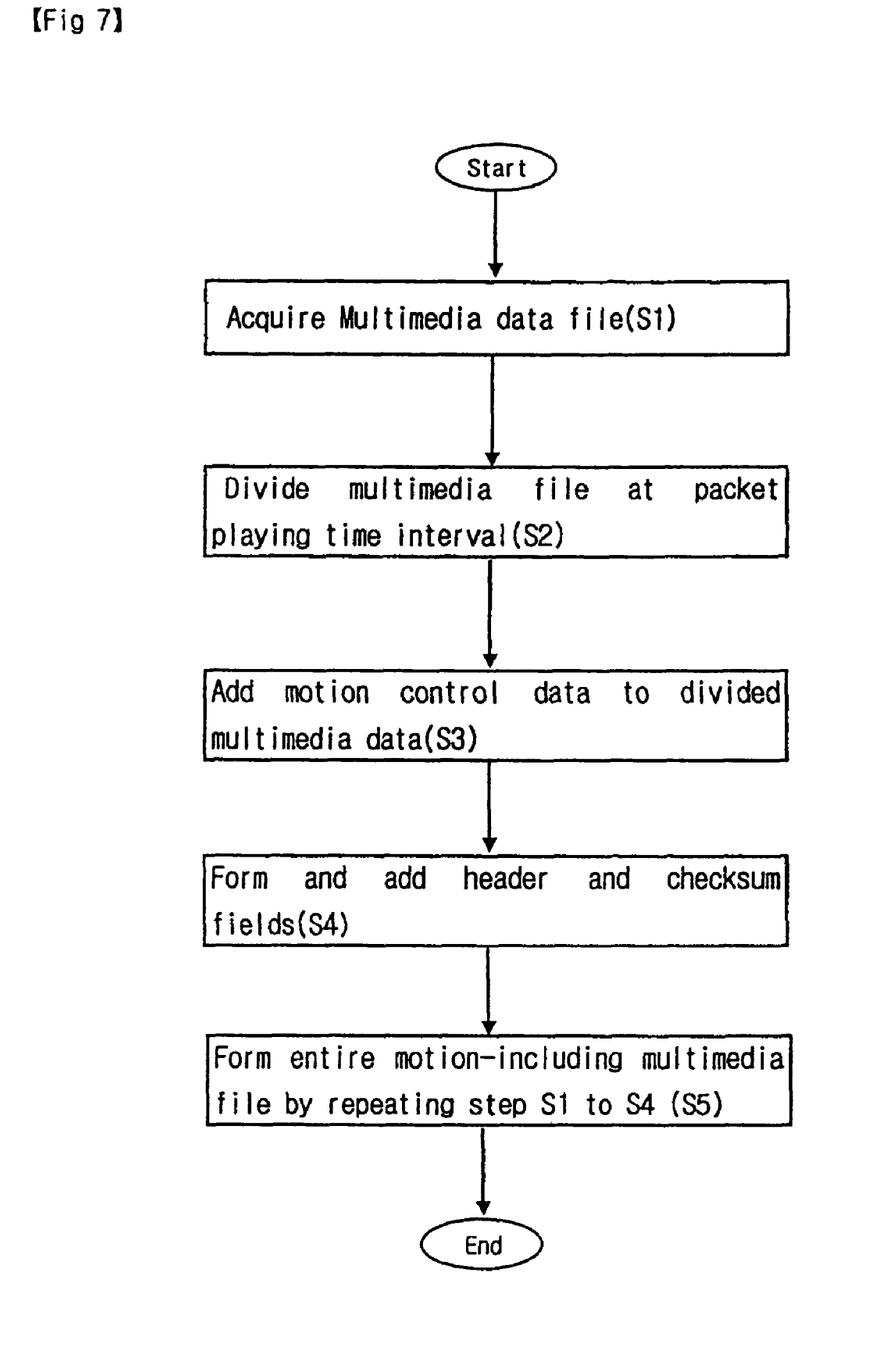
FIG. 7 is a flowchart illustrating a process of forming motion-including multimedia content data packet according to the present invention.

First, an existing general multimedia content file (composed of voice and image files synchronized with each other), such as a narrated fairy tale, learning images or music (children's song) video, which is formed by actual images captured by an image capturing means such as a video camera or by dubbing voice onto computer graphic images, is acquired at step S1. In order to transmit the multimedia content file on a packet basis and combine the multimedia content file with motion data, a voice file AD and an image file VD are divided at packet playing time intervals (Ts=40 ms), so that the entire voice file is divided into AD1, AD2, . . . , and ADn and the entire image file VD is divided into VD1, VD2, . . . , and VDn at step S2.

For example, voice and images (for two seconds) corresponding to the greeting "How are you?" correspond to AD1, . . . , and AD50 and VD1, . . . , and VD50, respectively. In order to cause the robot terminal 1 to make a greeting motion (motion of bending the head, folding the hands and raising the head while opening and closing the lips) while generating utterances and display images regarding the greeting "How are you?", the server 7 generates motion control data MD1, . . . , and MD50, which define the control of motors and relays that operate the mouth, head and arms of the robot terminal 1, for 50 packet playing time intervals (Ts=40 ms), and adds the motion control data MD1, . . . , and MD50 to AD1, . . . , and AD50 and VD1, . . . , and VD50 at step S3 to form a plurality of data sets. 50 packets are formed by repeatedly forming header and checksum fields for each of the data sets (AD1, VD1, MD1), . . . , and (AD50, VD50, MD50) and adding the header and checksum fields to each data set at steps S4 and S5.

When the motion-including multimedia content data packets for packet stream transmission are formed by combining voice and image portions (requiring motion control data) with motion control data using the above-described method, the entire motion-including multimedia content data is achieved, and then stored in the storage device (not shown) of the server 7. When this process is repeated for various multimedia content, various motion-including multimedia content data are stored in the storage device of the server 7. In this case, if various types (model) of robot terminals 1 exist, motion control data is formed according to the type of a robot terminal 1, inserted in synchronization with multimedia content, and complete multimedia data, including motion control data, for each model must be stored in the server 7.

Figure 8:
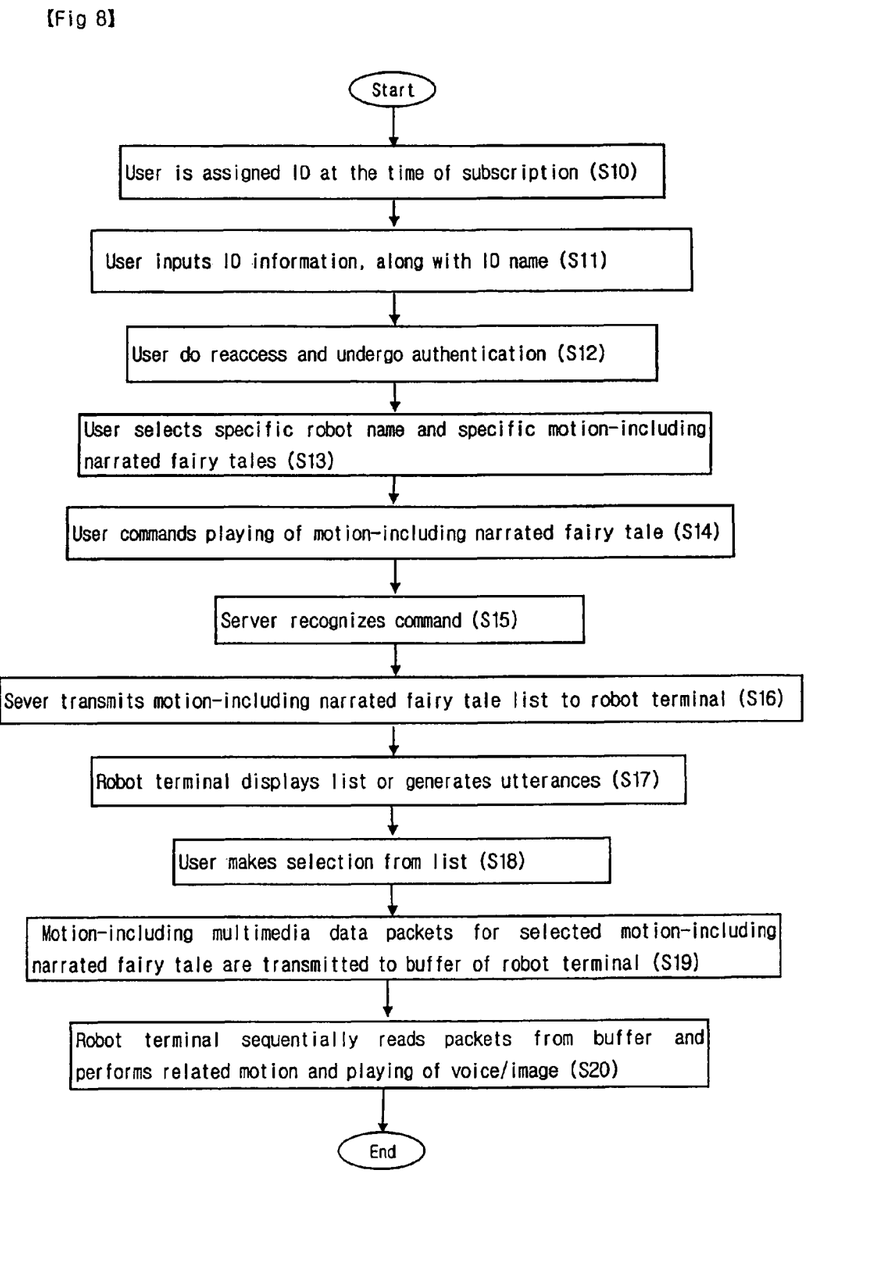
FIG. 8 is a flowchart illustrating a process of selecting and playing a narrated fairy tale including motions according to the present invention.

Next, a process in which the user accesses the server 7 via a PC (not shown), purchases multimedia content including motion information, such as a narrated fairy tale including motions, to which the user desires to listen in the robot terminal 1, and then listens to the purchased narrated fairy tale including motions, is described with reference to FIG. 8.

Figure 9:
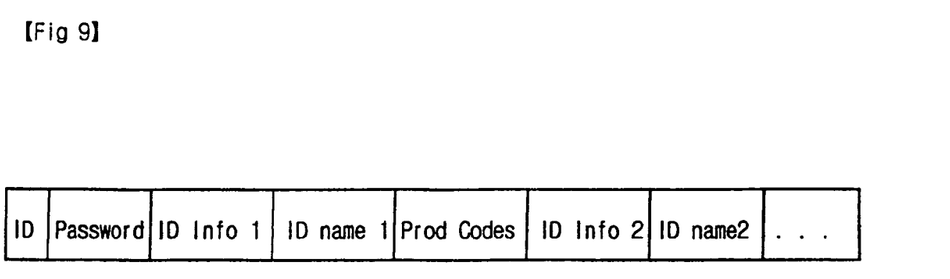
FIG. 9 is a diagram illustrating the structure of a user DB stored in a server.

When the user first accesses the website of the server 7 via the PC, is assigned an IDentification (ID) in a subscription procedure at step S10, and inputs the model names and serial numbers of the robot terminals 1 (collectively referred to as "robot terminal ID information") possessed by the user, along with ID names (for example, "robot 1", "robot 2", . . . ), at a subscription step or subsequent access step at step S11, the server 7 stores the ID information and ID names, together with the ID and the password, in the user DB, as illustrated in FIG. 9.

Now, in order to purchase a specific one of the narrated fairy tales, including motions, that are provided by the website, the user accesses the website of the server 7 and completes an authentication procedure by inputting his or her ID and password at step S12, and selects a specific robot name (for example, "robot 1") and a specific narrated fairy tale (for example, "the Tortoise and the Hare"), including motions, to which the user desires to listen in the robot terminal 1 while viewing a list of narrated fairy tales, including motions, provided by the website and a list of the names of the robots possessed by the user at step S13. At the time of purchase, further purchase procedures (payment and the like) are performed and the product code of the narrated fairy tale is stored, so that a selection and purchase procedure that is required when the robot 1 plays the narrated fairy tale "the Tortoise and the Hare" including motions is completed. When an additional purchase is required for the same robot terminal "robot 1" or a purchase is required for another robot terminal "robot 2", the above-described process is repeated. Through the above-described process, the user DB illustrated in FIG. 9 is achieved.

When the user pushes a motion-including narrated fairy tale play button in the robot terminal 1 (robot 1) or a remote controller for the robot terminal 1 or orally issues a command because the user desires to listen to the fairy tale at step S14, the ID information (information about the model name and the serial number) of the robot terminal 1, along with the command (button information or command voice file), is transmitted to the server 7. Then, the server 7 recognizes the command to play the narrated fairy tale through voice recognition in the case of the voice command or the pressing of the narrated fairy tale button in the case where the narrated fairy tale button is pressed at step S15, and transmits a list of narrated fairy tales, including motions, corresponding to the ID information (model name and serial number) provided from the user DB to the robot terminal 1 at step S16. The robot terminal 1 displays the list of purchased fairy tales on the monitor so that the user can select one fairy tale from the list if the robot terminal 1 is provided with a monitor, or generates utterances regarding the titles of the fairy tales, such as "select No. 1 for the Tortoise and the Hare, or select No. 2 for Snow White and the Seven Dwarfs," if the robot terminal 1 is not provided with a monitor at step S17.

When the user uses a touch screen function or presses a numeric button of the robot terminal 1 or remote controller when the list is displayed on the monitor of the robot terminal 1, or presses a numeric button of the robot terminal 1 or remote controller or vocally selects a number in the case of the voice utterance at step S18, information about the selected number is transmitted to the server 7, the server 7 recognizes the selected number, and a data packet stream regarding the selected narrated fairy tale including motions is transmitted to the robot terminal 1 and stored in the downstream buffer, as illustrated in FIG. 3, at step S19. At this time, the service server 7 adjusts the number of transmission packets by examining the state of the buffer whenever transmitting one or more motion-including multimedia data packets to the downstream buffer so as to prevent the buffer from being overflown.

The motion-including multimedia data packets stored in the downstream buffer are read by the processing device (not shown) of the robot terminal 1 one by one at packet playing intervals Ts, and data size regions (ML, AL, VL) included in a header are examined. If the packet includes all of the motion, voice and image data, corresponding data is read from the motion control data region MD, the voice data region AD and the image data region VD. The motion control data MD is transmitted to the motor/relay driving circuit 3 and drives the motor/relay 2, thus implementing a motion, the voice data AD is converted into an analog voice signal through the decoder and the D/A converter 6 and generates utterances in the speaker 10, and the image data VD is displayed on a monitor through the decoder and the image display control device, at step S20. Accordingly, related motions are performed while reading the narrated fairy tale and displaying related images on the monitor, so that it is possible to provide an interesting fairy tale including motions.

Although the preferred embodiments of the present invention have been described above, it should be noted that the present invention is not limited to these embodiments, but various modifications are possible in a range without departing from the spirit of the present invention.

For example, although the method of forming motion-including multimedia files for previously processed multimedia content including narrated fairy tales, storing the multimedia files in the service server 7, and transmitting a selected specific motion-including multimedia file to the robot terminal 1 and playing the selected specific motion-including multimedia file at a designated time when the user selects the specific motion-including multimedia file has been described, the present invention can be applied to cases where voice and/or images must be played in the robot terminal 1 in real time, such as a radio broadcast, a TeleVision (TV) broadcast and a telephone call (collectively referred to as "multimedia providing media") that are not previously processed and exist, but are provided in real time.

In these cases, for example, a process of selecting listening to the voice of a specific radio channel by the user at the selection step S13, converting an analog voice signal, input from a radio receiver in real time, into a digital voice signal through sampling and A/D conversion and inputting the digital voice signal to the service server 7, gathering digital voice signals for the packet playing time interval (Ts=40 ms), forming motion-including multimedia packet data by adding motion control data (in a simple case, motion control data for opening and closing the mouth) for the robot terminal 1 to the digital voice signals at intervals of 40 ms and updating the multimedia packet data is repeated.

When the user desires to listen to a motion-including radio broadcast in the specific robot terminal 1, radio broadcast voice packets formed in real time are transmitted to and stored in the downstream buffer of the robot terminal 1 and the robot terminal 1 reads the stored radio broadcast voice packets from the downstream buffer and plays the stored radio broadcast voice packets at packet playing time intervals Ts.

In the case of multimedia content provided in real time, it is not preferable to provide a downstream buffer having about 50 zones, as for multimedia content that is previously processed and exists, because the real-time multimedia content must be played in the robot terminal 1 almost in synchronization with the timing of a real broadcast or call. The reason for this is that, if the buffer has 50 zones (which corresponds to a playing time of 2 seconds for motion-including multimedia content) in the case of a real-time broadcast or call, in the worst case, a broadcast or call that was performed 2 seconds before can be played in the robot terminal 1, so that the effect of a real-time broadcast or call is weakened. In particular, since a telephone call is performed between two parties, a delay of a minimum of 2 seconds inconveniences the call. Accordingly, if ten or less buffer zones are provided, such a delay problem can be mitigated. However, the number of buffer zones is ultimately determined based on the Quality of Service (QOS) of a network infrastructure.

Meanwhile, although the selection and purchase of motion-including multimedia have been described as being performed via the PC, such selection and purchase can be performed via an information terminal that can access a network, such as a Personal Digital Assistant (PDA) or a mobile phone. Such selection and purchase can be performed using the robot terminal itself, in which case an effort to access a website can be reduced.

Furthermore, motion-including multimedia content packet data having a format shown in FIG. 4 may be simplified into a form in which a version number V and a time stamp TS are omitted, and then stored in the server. In this case, identifiers for identifying respective packets must exist between the respective packets.

Meanwhile, the method of dividing a multimedia content file into packets at packet transmission time intervals, forming motion-including multimedia content packet data by inserting motion control data to the packets, storing the motion-including multimedia contents packets data in the server 7, and transmitting related motion-including multimedia content packet data to the robot terminal 1 when the user makes a purchase or selection and requests playing has been described in the above description. In the case where a process of generating motion control data for respective packets can be performed in the server 7 in real time (for example, a case where the time taken by the server 7 to generate motion control data is short because motion control data to be produced is simple, like lip motion control data), a method of storing only an original multimedia file in the server 7, and forming motion control data in the server 7, inserting the motion control data into the original data file and transmitting the data file including the motion control data to the robot terminal 1 at the time of transmission to the robot terminal 1 for playing, as in real-time broadcasting, may be used. In this case, since it is not necessary to store the multimedia content packet data in the server 7 in advance, the capacity of the storage device of the server 7 can be considerably reduced.

However, in the case where motion control data cannot be formed in real time, if an original multimedia file and corresponding motion control data are separately stored in the server 7 in advance and they are added together and then transmitted at the time of transmission to the robot terminal 1 for playing, a slightly larger storage space is required, compared to the case of the generation of motion control data in real time, but the capacity of the storage device of the server 7 can be considerably reduced.

As described above, the present invention provides the processing method for playing multimedia content including motion information in a network-based robot system, through which a low price home robot can be provided and the home robot can make motions synchronized with the playing of voice and images.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A processing method for playing a motion-including multimedia content using a network-based robot system, the network-based robot system including robot terminals connected to a network and a service server configured to control the robot terminals, the method comprising:

forming and storing, by the service server, motion-including multimedia content data packets by inserting synchronized robot terminal motion control data into a multimedia content file divided at packet playing time intervals;

when a user issues a command to play a specific motion-including multimedia content in a specific robot terminal, transmitting the command to the service server;

in response to the transmitted command, reading, by the service server, motion-including multimedia content data packets corresponding to the specific motion-including a multimedia content and sequentially transmitting, by the service server, the read motion-including multimedia content data packets to a buffer of the specific robot terminal in a packet form;

sequentially storing, by the specific robot terminal, the motion-including multimedia content data packets in the buffer;

at the packet playing time intervals, sequentially reading, by the specific robot terminal, motion data and multimedia data included in each of the motion-including multimedia content data packets from the buffer, and transferring the read motion data and the read multimedia data directly to at least one corresponding playing device; and reproducing, by the at least one corresponding playing device, a motion and/or voice and/or an image, based on the transferred motion data and the transferred multimedia data, wherein the robot terminal has only a basic construction to act as a terminal for reproduction of the motion-including multimedia content data packets, wherein the robot terminal has at least one sensor which detects conditions of surroundings of the robot terminal and sensor values of which is transmitted to the service server through the network at preset intervals without any direction of the service server, wherein a size of the buffer is a minimum buffer size sufficient to allow the reproducing of the motion and/or the voice and/or the image without discontinuity due to lack of uniformity in time delay in the network, and wherein at least one of the motion-including multimedia content data packets transmitted from the service server to the buffer of the specific robot terminal includes a system command which controls the robot terminal to take an urgent measure in accordance with the sensor values of the robot terminal and is executed without being stored in the buffer, the system command being generated by the service server which controls the robot terminal to take the urgent measure in case of urgency judging by the service server based on the sensor values received by the service server at the preset intervals.

2. A processing method for playing motion-including a multimedia content using a network-based robot system, the network-based robot system including robot terminals connected to a network and a service server configured to control the robot terminals, the method comprising:

when a user issues a command to play a specific motion-including multimedia content in a specific robot terminal, transmitting the command to the service server;

in response to the transmitted command, forming, by the service server, motion-including multimedia content data packets by inserting synchronized robot terminal motion control data into a multimedia content file for the specific motion-including multimedia content, which is divided at packet playing time intervals, and sequentially transmitting, by the service server, the motion-including multimedia content data packets to a buffer of the specific robot terminal in a packet form;

sequentially storing, by the specific robot terminal, the motion-including multimedia content data packets in the buffer;

at the packet playing time intervals, sequentially reading, by the specific robot terminal, motion data and multimedia data included in each of the motion-including multimedia content data packets from the buffer, and transferring the read motion data and the read multimedia data directly to at least one corresponding playing device; and reproducing, by the at least one corresponding playing device, a motion and/or voice and/or an image, based on the transferred motion data and the transferred multimedia data, wherein the robot terminal has only a basic construction to act as a terminal for reproduction of the motion-including multimedia content data packets, wherein the robot terminal has at least one sensor which detects conditions of surroundings of the robot terminal and sensor values of which is transmitted to the service server through the network at preset intervals without any direction of the service server, wherein a size of the buffer is a minimum buffer size sufficient to allow the reproducing of the motion and/or the voice and/or the image without discontinuity due to lack of uniformity in time delay in the network, and wherein at least one of the motion-including multimedia content data packets transmitted from the service server to the buffer of the specific robot terminal includes a system command which controls the robot terminal to take an urgent measure in accordance with the sensor values of the robot terminal and is executed without being stored in the buffer, the system command being generated by the service server which controls the robot terminal to take the urgent measure in case of urgency judging by the service server based on the sensor values received by the service server at the preset intervals.

3. The processing method as set forth in claim 1 or 2, further comprising accessing, by the user, the service server and storing identification information about the robot terminals possessed by the user and motion-including multimedia content information selected by the user in the service server.

4. The processing method as set forth in claim 3, wherein the access to the service server by the user is performed via a Personal Computer (PC).

5. The processing method as set forth in claim 1 or 2, wherein the multimedia content is a narrated fairy tale.

6. The processing method as set forth in claim 1 or 2, wherein the multimedia content is learning content.

7. The processing method as set forth in claim 1 or 2, wherein the transmission of the motion-including multimedia content data packets is performed in such a manner that the service server examines a state of the buffer of the robot terminal and continuously transmits a number of packets equal to a number of vacant zones of the buffer.

8. A processing method for playing a motion-including multimedia content for multimedia providing media using a network-based robot system in real time, the network-based robot system including robot terminals connected to a network and a service server configured to control the robot terminals, the method comprising:

forming, by the service server, multimedia content data packets by gathering a multimedia content provided in real time by a multimedia providing medium selected by a user at packet transmission time intervals, and forming, by the service server, motion-including multimedia content data packets by inserting synchronized robot terminal motion control data into the formed multimedia content data packets;

sequentially transmitting, by the service server, the motion-including multimedia content data packets to a buffer of a specific robot terminal in packet form;

sequentially storing, by the specific robot terminal, the motion-including multimedia content data packets in the buffer;

at the packet playing time intervals, sequentially reading, by the specific robot terminal, motion data and multimedia data included in each of the motion-including multimedia content data packets from the buffer, and transferring the read motion data and the read multimedia data directly to at least one corresponding playing device; and reproducing, by the at least one corresponding playing device, a motion and/or voice and/or an image, based on the transferred motion data and the transferred multimedia data, wherein the robot terminal has only a basic construction to act as a terminal for reproduction of the motion-including multimedia content data packets, wherein the robot terminal has at least one sensor which detects conditions of surroundings of the robot terminal and sensor values of which is transmitted to the service server through the network at preset intervals without any direction of the service server, wherein a size of the buffer is a minimum buffer size sufficient to allow the reproducing of the motion and/or the voice and/or the image without discontinuity due to lack of uniformity in time delay in the network, and wherein at least one of the motion-including multimedia content data packets transmitted from the service server to the buffer of the specific robot terminal includes a system command which controls the robot terminal to take an urgent measure in accordance with the sensor values of the robot terminal and is executed without being stored in the buffer, the system command being generated by the service server which controls the robot terminal to take the urgent measure in case of urgency judging by the service server based on the sensor values received by the service server at the preset intervals.

9. The processing method as set forth in claim 8, wherein the multimedia providing medium is radio broadcasting.

10. The processing method as set forth in claim 8, wherein the multimedia providing medium is a telephone.

* * * * *